W. C. DURANT.
CONTROL LEVER FOR AUTOMOBILES.
APPLICATION FILED APR. 4, 1912.
1,072,438.
Patented Sept. 9, 1913.
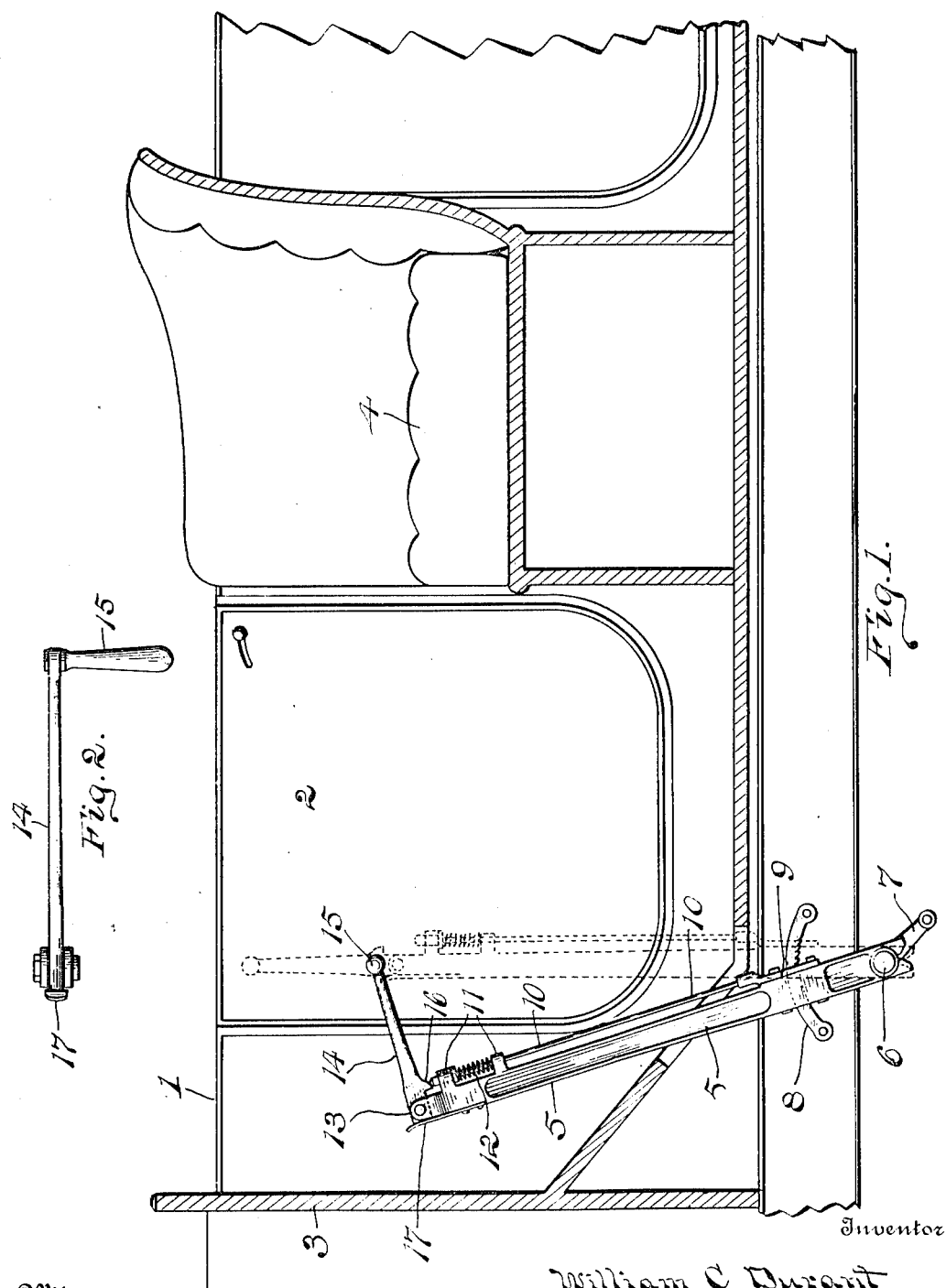

UNITED STATES PATENT OFFICE.

WILLIAM C. DURANT, OF DETROIT, MICHIGAN, ASSIGNOR TO CHEVROLET MOTOR COMPANY, OF DETROIT, MICHIGAN, A CORPORATION OF MICHIGAN.

CONTROL-LEVER FOR AUTOMOBILES.

1,072,438.  Specification of Letters Patent.  Patented Sept. 9, 1913.

Application filed April 4, 1912. Serial No. 688,445.

*To all whom it may concern:*

Be it known that I, WILLIAM C. DURANT, a citizen of the United States of America, residing at Detroit, in the county of Wayne and State of Michigan, have invented certain new and useful Improvements in Control-Levers for Automobiles, of which the following is a specification, reference being had therein to the accompanying drawings.

In the construction of automobiles where bodies of the fore door type are used, the control lever as commonly constructed and arranged blocks the entrance to the car through one of the side fore doors, and it is the object of this invention to provide a controlling lever which is so constructed and arranged that it does not block the entrance to the vehicle and is readily and conveniently operable.

To this end the invention consists in the matters hereinafter set forth and more particularly pointed out in the claims reference being had to the accompanying drawing, in which—

Figure 1 is a longitudinal vertical section through a portion of an automobile body of the fore door type showing a controlling lever embodying the invention in operative position thereon; and Fig. 2 is an enlarged plan view of the upper end of the lever.

An automobile body 1 of any desired design and construction is provided with a door 2 to close the entrance to the space between the dash 3 and the forward seat 4. A brake or other controlling lever 5 is pivoted at 6 to the chassis of the automobile in the usual manner and has an arm 7 attached thereto for operating the brake or other mechanism of the car. A notched sector 8 is provided and a suitable latch plate 9 carried by the lever is adapted to engage the notches of the sector and hold the controlling lever in the position to which it is turned. A rod 10 connected to the plate 9 extends upward through suitable guides 11 near the upper end of the lever for moving the plate and disengaging the same from the sector. A spring 12 on the rod normally holds the rod lifted with the plate in engagement with the sector.

Pivotally attached to the upper end of the controlling lever between upwardly extending ears 13 thereon, is a handle or extension lever 14 which is provided with a laterally extending hand grip 15 at its upper end. This extension is adapted to be turned upon its pivot to bring a lug 16 thereon into engagement with the upper end of the operating rod 10 and move said rod longitudinally against the action of the spring 12 to release the operating lever, and a flat spring 17 secured to one edge of the lever engages a flat end of the extension to hold said extension turned to a position at right angles to the lever as shown in full lines in Fig. 1 with its lug 16 adjacent to the upper end of the operating rod. This spring also serves by its engagement with a flat side of the extension to hold said extension from turning when the same is turned into alinement with the lever, as shown in dotted lines. The weight of the extension is supported by the spring when said extension is in angular position and does not rest upon the rod, thus obviating the liability of the lever being accidentally released by the weight of the extension and preventing rattling. As brake levers are commonly arranged, when said lever is in the position shown in full lines, the brakes are released and when swung rearwardly into the position shown in dotted lines, the brakes are set. If a lever of the common construction should be positioned near enough to the dashboard to permit the operator to enter the car through the door 2 when the brakes are set and the car standing still, it would be out of convenient reach of the operator when thrown forward to release the brakes. By providing the lever with a pivotally connected extension, as embodied in this invention, the hand grip of the lever is brought into a convenient position to be grasped when the brake lever is thrown into forward position, and further, when the lever is thrown to set the brakes the extension may be turned upwardly, as shown in dotted lines, to provide ample space between it and the seat to permit the operator to enter the car behind the lever when in this position. The arrangement of the pivoted extension also provides a convenient means for operating the latch and releasing the lever as it is only necessary to press downward upon the extension against the action of the spring 17, to release the lever.

It will be understood that this construction of brake lever may be employed as well in connection with brake mechanism which is operated to set the brakes by a forward movement of the lever, and that other obvious changes in the arrangement and construction of the lever may be made without departing from the spirit of my invention, and I do not wish to limit myself to the particular form or application of lever shown.

Having thus fully described my invention what I claim is:—

1. The combination with an automobile body having a seat and a door in its side adjacent to the forward side of said seat, of a control lever pivotally supported in front of said door adjacent to the side thereof farthest from the seat to turn upon a horizontal axis, an extension pivotally attached to the upper end of said lever to be turned to extend laterally from the lever toward the seat, and a hand grip on the end of said extension.

2. The combination with an automobile body having a seat and an entrance adjacent to the forward side of said seat, of a control lever pivotally supported near its lower end to turn upon a horizontal axis and to extend upwardly within said entrance near the side thereof farthest from the seat, means for holding the lever in the position to which it is turned, and an extension pivotally attached to the lever to be turned thereon to extend laterally therefrom toward the seat and adapted to operate said means to release the lever when so turned.

3. The combination with an automobile body having a seat and a door in its side adjacent to the forward side of said seat, of a control lever pivotally supported within the body forwardly of the seat and adjacent to the side of the door farthest from said seat to turn upon a horizontal axis, means for holding the lever in the position to which it is turned comprising a member extending to the upper end of the lever, an extension pivotally attached to the upper end of the lever to be turned thereon and extend laterally thereof toward the seat, said member being also adapted to engage intermediate its ends the upper end of the member of the holding means to release the lever by a downward pressure on the free end of the extension, and a hand grip on the end of the extension extending transversely thereto.

4. The combination with an automobile body having a seat and a door in its side, adjacent to the forward side of said seat, of a control lever pivotally supported at its lower end within the body adjacent to the forward side of said door to swing forwardly from in front of said door upon a horizontal axis, means for holding said lever in the position to which it is turned, an extension member pivotally attached to the upper end of said lever to be turned thereon to extend rearwardly therefrom toward the seat and operate the holding means to release the lever when so turned and to be turned into alinement with said lever to give free entrance through the door opening, a spring to engage and yieldingly hold said extension member in the position to which it is turned upon said lever, and a handle on the free end of said extension member extending laterally therefrom away from the inner side of the door.

In testimony whereof I affix my signature in presence of two witnesses.

WILLIAM C. DURANT.

Witnesses:
ANNA M. DORR,
LEWIS E. FLANDERS.